United States Patent [19]

Fries

[11] Patent Number: 5,116,795
[45] Date of Patent: May 26, 1992

[54] ALPHA OLEFIN OLIGOMERIZATION CATALYST

[75] Inventor: Richard W. Fries, Joliet, Ill.

[73] Assignee: Quantum Chemical Corporation, Cincinnati, Ohio

[21] Appl. No.: 506,577

[22] Filed: Apr. 9, 1990

Related U.S. Application Data

[60] Continuation of Ser. No. 331,019, Mar. 29, 1989, abandoned, which is a continuation of Ser. No. 11,034, Mar. 25, 1987, abandoned, which is a continuation of Ser. No. 856,499, Apr. 28, 1986, abandoned, which is a division of Ser. No. 761,876, Aug. 2, 1985, abandoned.

[51] Int. Cl.$^5$ .............................................. C08F 4/652
[52] U.S. Cl. ................................. 502/117; 585/512; 585/511
[58] Field of Search ........................................ 502/117

[56] References Cited

U.S. PATENT DOCUMENTS

| | | | |
|---|---|---|---|
| 2,085,535 | 6/1937 | Langedijk et al. | 585/507 |
| 2,965,627 | 12/1960 | Field et al. | 260/94.9 |
| 2,969,408 | 1/1961 | Nowlin et al. | 260/683.15 |
| 3,026,312 | 3/1962 | Hagemeyer et al. | 260/93.7 |
| 3,151,181 | 9/1964 | Hewitt et al. | 585/523 |
| 3,161,628 | 12/1964 | Dost et al. | 260/94.9 |
| 3,168,588 | 2/1965 | White et al. | 260/683.15 |
| 3,341,619 | 9/1967 | Stogryn et al. | 585/523 |
| 3,474,157 | 10/1969 | White et al. | 585/523 |
| 3,513,096 | 5/1970 | Brownawell et al. | 252/59 |
| 3,544,533 | 12/1970 | Dreyfuss | 502/129 |
| 3,661,882 | 5/1972 | Hawkins et al. | 585/523 |
| 3,662,021 | 5/1972 | Langer et al. | 260/683.15 D |
| 3,798,284 | 3/1974 | Tesel et al. | 585/523 |
| 3,862,257 | 1/1975 | Buben et al. | 585/523 |
| 3,984,389 | 10/1976 | Delbouille et al. | 526/124 |
| 4,361,714 | 11/1982 | Langer et al. | 585/521 |
| 4,377,720 | 3/1983 | Langer et al. | 585/527 |
| 4,396,788 | 8/1983 | Langer et al. | 585/523 |
| 4,409,414 | 10/1983 | Langer | 585/524 |
| 4,434,312 | 2/1984 | Langer | 585/523 |
| 4,434,313 | 2/1984 | Langer | 585/527 |
| 4,442,309 | 4/1984 | Langer | 585/523 |
| 4,486,615 | 12/1984 | Langer | 585/523 |
| 4,540,756 | 9/1985 | Johnson | 526/124 |

FOREIGN PATENT DOCUMENTS

| | | |
|---|---|---|
| 42-10605 | 6/1967 | Japan . |
| WO80/00224 | 2/1980 | PCT Int'l Appl. . |
| 1042701A | 9/1983 | U.S.S.R. . |
| 785314 | 10/1957 | United Kingdom . |
| 1020320 | 2/1966 | United Kingdom . |
| 1065514 | 4/1967 | United Kingdom . |

OTHER PUBLICATIONS

Boor, Ziegler-Nalta Catalysts and Polymerizations Academic Press, N.Y. (1979) pp. 602-609.

*Primary Examiner*—Edward J. Smith
*Attorney, Agent, or Firm*—Marshall, O'Toole, Gerstein, Murray & Bicknell

[57] ABSTRACT

A process for the preparation of linear olefins which comprises polymerizing ethylene in a hydrocarbon solvent at a temperature of 50°-150° C. in the presence of a catalyst comprising a zirconium metal compound, an organometallic compound wherein the metal is selected from the group consisting of zinc, magnesium and aluminum, and a basic salt of a carboxylic acid which forms a fine suspension or a homogeneous solution in the hydrocarbon solvent wherein the ratio of the salt equivalents to the moles of zirconium compound is from above 0 to about 4.0.

12 Claims, 4 Drawing Sheets

ALPHA OLEFIN OLIGOMERIZATION CATALYST

This is a continuation of U.S. Ser. No. 07/331,019, filed Mar. 29, 1989 now abandoned, which is in turn a continuation of U.S. Ser. No. 07/011,034, filed Mar. 25, 1987, now abandoned; which is in turn a continuation of U.S. Ser. No. 856,499, filed now abandoned; which is in turn a divisional of U.S. Ser. No. 761,876, filed Aug. 2, 1985, now abandoned.

BACKGROUND OF THE INVENTION

This invention relates to an improved process for preparing linear olefins, particularly linear alpha olefins. More particularly, this invention relates to an improved process for oligomerizing ethylene or propylene or other alpha olefins to obtain oligomers which are linear olefins having from about 4 to about 20 carbon atoms. This invention also relates to a method for polymerizing or copolymerizing these linear olefins to produce higher molecular weight polymers.

U.S. Pat. No. 4,442,309, issued to Arthur W. Langer, Jr. on Apr. 10, 1984, is one of several patents assigned to Exxon Research & Engineering Company which discloses a method for preparing linear olefins of the type prepared according to the present invention. This reference discloses the polymerization of ethylene in the presence of a catalyst comprising the reaction product of a zirconium transition metal halide and an aluminum alkyl compound The polymerization reaction takes place in the presence of a diluent such as chlorobenzene, dichlorobenzene, chlorotoluene, aromatics such as benzene, toluene, and xylene, and aliphatics such as pentane and heptane. The reaction temperature is about 75° to 200° C. and the ethylene pressure is above 50 psia while the mole ratio of ethylene to olefin reaction products is maintained above about 0.8 throughout the reaction. The process disclosed in the patent requires the step of killing catalyst activity after at least about 5 weight percent, based on diluent, of product olefin has formed by adding an agent or agents to kill the polymerization activity, thereby preventing or inhibiting deleterious side reactions. Typical killing agents mentioned are water, alcohol, carboxylic acids and phenols. The patent also states that a neutralizing agent must be used to neutralize the Friedel-Crafts activity of the catalyst which remains a problem even after polymerization activity is killed. Neutralizing bases which can be used include any Lewis base, i.e. alkali metal and alkyline earth metal hydroxides and carbonates, ammonium hydroxide, and ammonia among others.

Russian Inventor's Certificate No. SU104-701-A discloses a catalyst for ethylene oligomerization. The catalyst is comprised of zirconium salts of carboxylic acids and an alkyl aluminum sesquichloride. It is said that oligomerization can take place at 5 to 30 atmospheres and 60° to 100° C. in an aromatic solvent. When this reaction is carried out and the reactor is opened after completion thereof, the reaction mixture becomes yellow, fuming and the amount of olefin rapidly decreases with time due to Friedel-Crafts alkylation of the solvent. In order to prevent loss of the olefin, the reaction mixture has to be cooled and neutralized as suggested in the Langer, Jr. patent discussed above.

It is an object of the present invention to provide a method for producing linear olefins with a zirconium catalyst wherein the process can be carried out to completion without the necessity of prematurely killing the polymerization activity by the addition of a polymerization killing agent as characterized in the patent to Langer, Jr. It is another object of this invention to provide a process for the production of linear olefins which can be carried out to completion without the addition of neutralizing agents to the reaction mixture to prevent Friedel-Crafts type reactions which result in the loss of the olefin product. Still another object is to have an additive which will not kill subsequent polymerizations with other Ziegler catalysts.

SUMMARY OF THE INVENTION

This invention relates to a process for the preparation of linear olefins (oligomers) which comprises polymerizing (oligomerizing) ethylene, propylene or other alpha olefins in a hydrocarbon solvent at a temperature of 50°–150° C., preferably 50°–100° C., in the presence of a catalyst comprising a zirconium metal compound, an organometallic compound wherein the metal is selected from the group consisting of zinc, magnesium and aluminum, and a basic salt of a carboxylic acid which forms a fine suspension or a homogeneous solution in the hydrocarbon solvent and, as a reaction product with said zirconium metal compound, forms a homogeneous solution or a fine suspension in the solvent. Up to four equivalents of the salt can be used per mole of the zirconium compound.

The zirconium metal compounds may have the formula:

$$ZrX_nY_{4-n}$$ 

wherein X is a halogen, Y is selected from the group consisting of aryloxides, alkoxides and carboxylates, and n ranges from 1 to 4. Most preferably, the zirconium compound is zirconium tetrachloride because it is less expensive and can be purchased in sufficient purity.

The hydrocarbon solvent may be selected from the group consisting of aromatic, saturated, partially unsaturated, partially halogenated, partially oxygenated hydrocarbons and mixtures thereof. Most preferably, the solvent is toluene or a xylene.

The organometallic compound may be selected from the group consisting of aluminum, zinc and magnesium alkyls, preferably alkyl aluminum sesquihalides, aluminum trialkyls or alkyl aluminum dihalides. Most preferably, the organometallic compound is ethyl aluminum sesquichloride or ethyl aluminum dichloride.

The basic salt may be selected from the group consisting of lithium, sodium, potassium, magnesium, calcium, zinc or aluminum salts of saturated, unsaturated, or aromatic carboxylic acids. Preferably, the basic salt is selected from the group consisting of lithium and calcium salts of aromatic carboxylic acids such as benzoate and aliphatic carboxylic acids such as stearate. Most preferably, the basic salt is calcium stearate.

The present invention also relates to catalysts for the polymerization of ethylene to form linear olefins. Also, this invention relates to the process for the production of such linear olefins and the further polymerization thereof to form higher molecular weight polymers and copolymers.

DETAILED DESCRIPTION OF THE DRAWINGS

Figure 1:
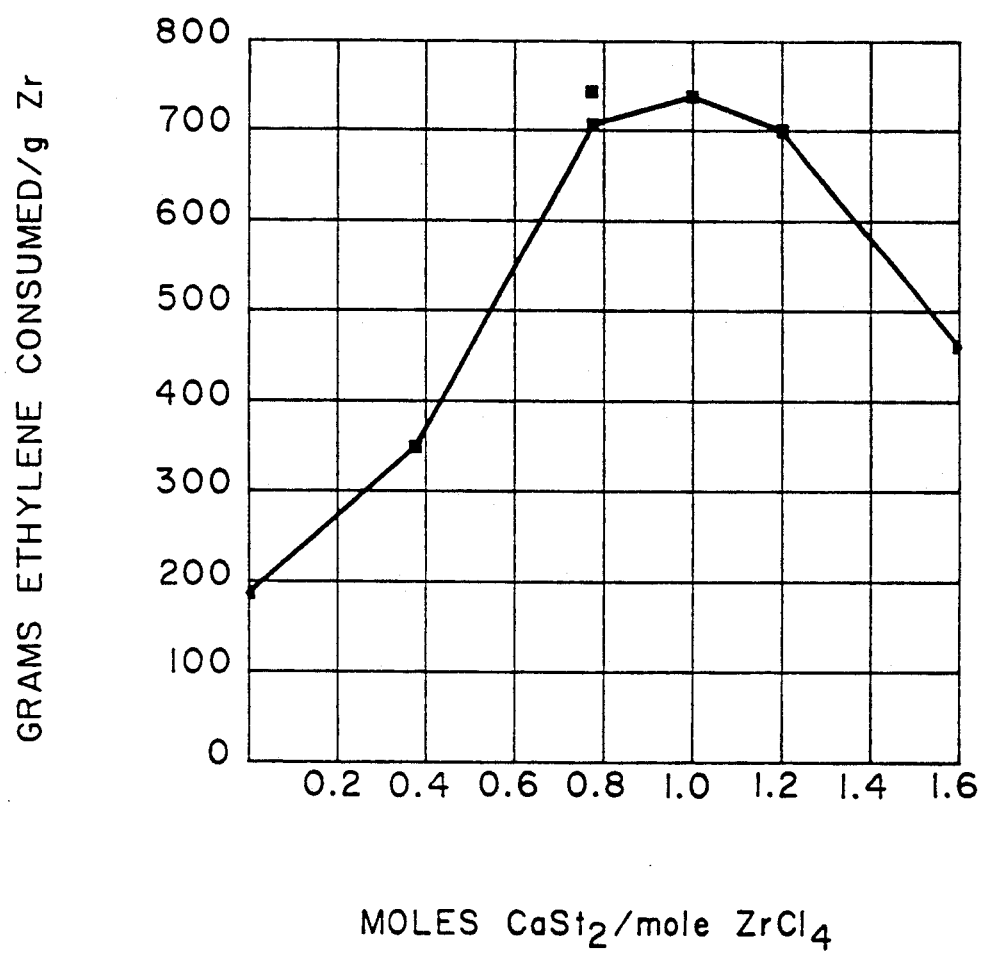

FIG. 1. Graph of the Effect of Calcium Stearate on the Olefin Oligomerization Reaction of Example I.

Figure 2:
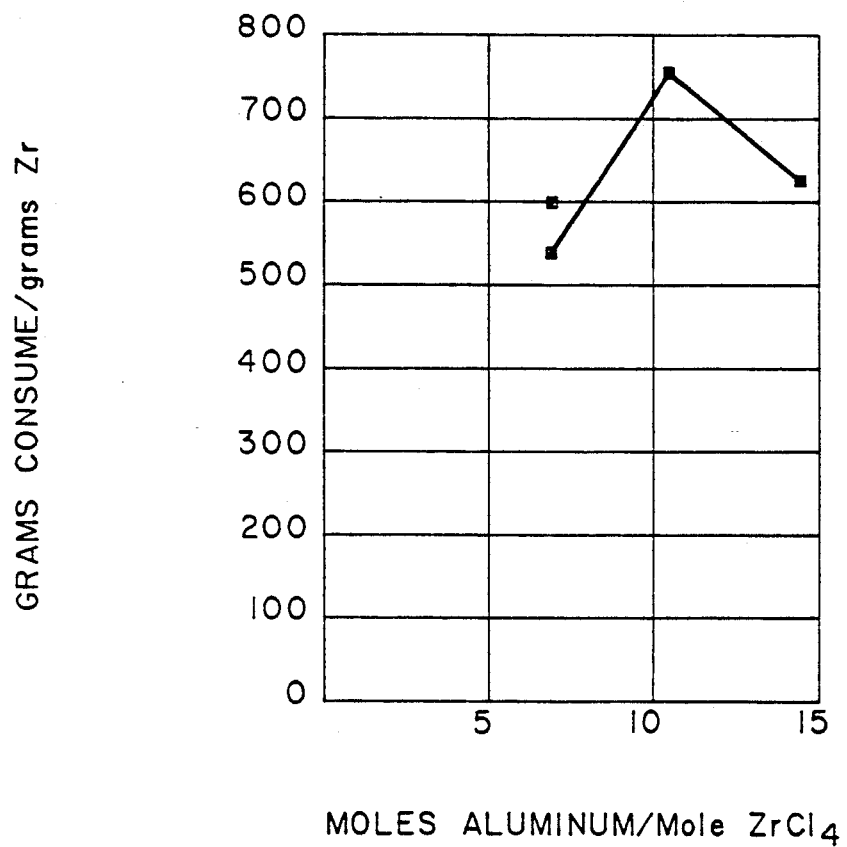

FIG. 2. Graph of the Effect of Ethyl Aluminum Sesquichloride on the Olefin Oligomerization Reaction of Example II.

Figure 3:
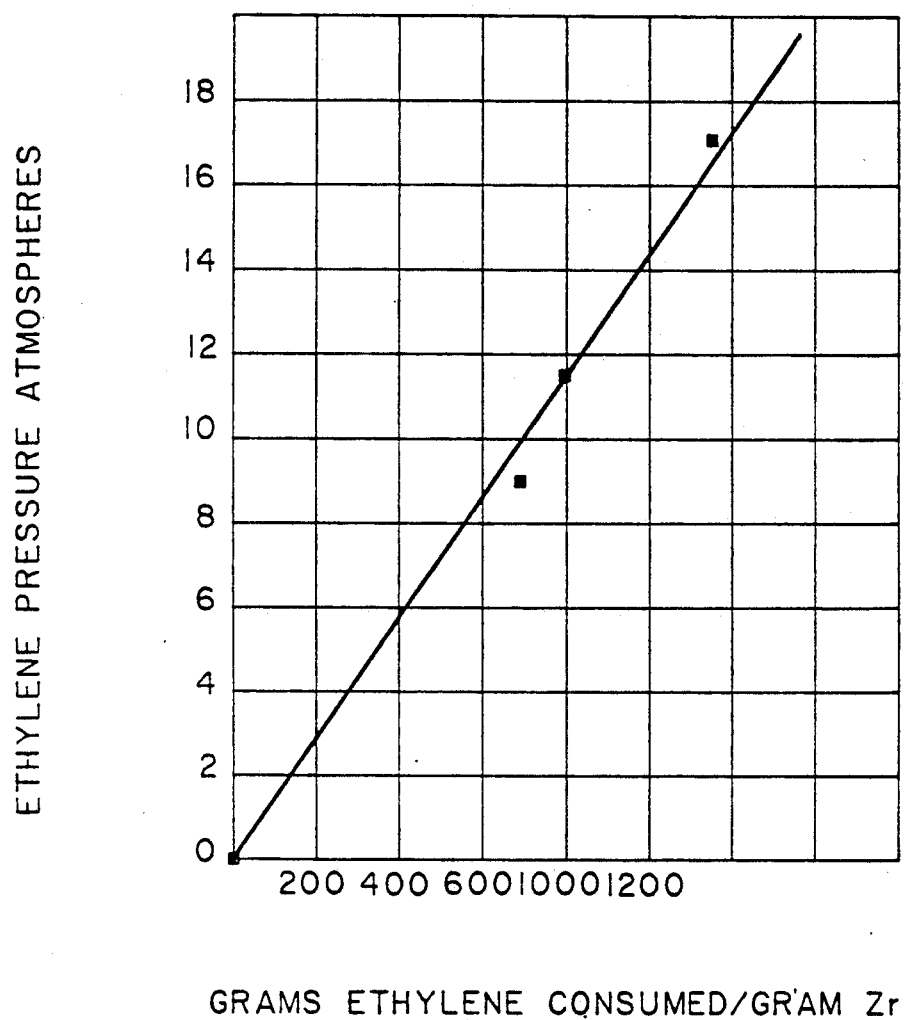

FIG. 3. Graph of the Effect of Pressure on the Olefin Oligomerization of Example III.

Figure 4:
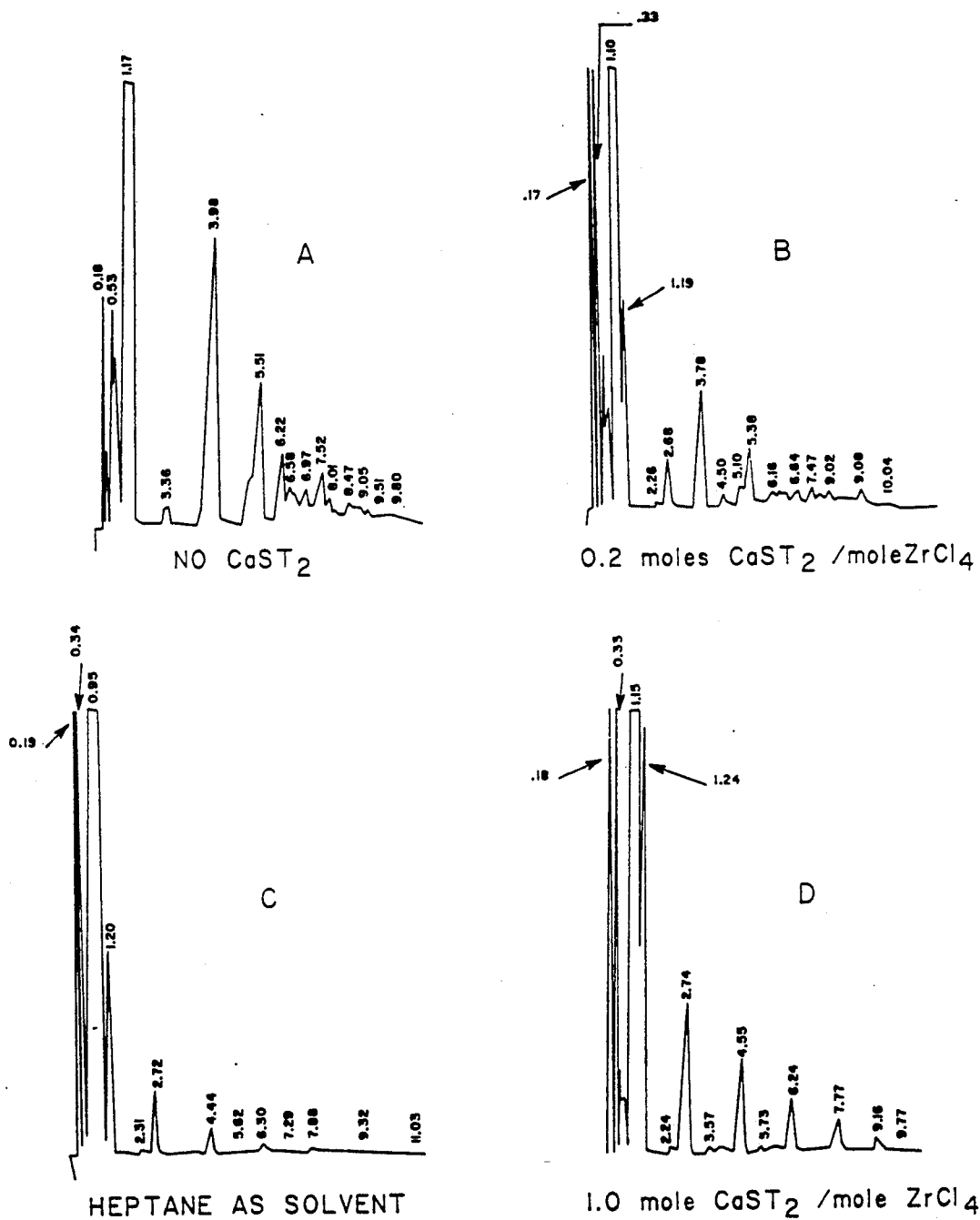

FIG. 4. Gas Chromatograph of the Polymerization Reactions of Example IV.

DETAILED DESCRIPTION OF THE INVENTION

The method of preparing the catalyst used in the process of the present invention is relatively simple. The zirconium metal compound is combined with the basic salt by placing both of them in a hydrocarbon solvent in which the zirconium metal compound and the basic salt for either a fine suspension or a homogenous solution. It is preferred that their reaction product form a fine suspension or a homogeneous solution in the hydrocarbon solvent.

The amount of the basic salt which is present in the catalyst is crucial to the performance thereof. Even small amounts of the basic salt will prevent some Friedel-Crafts alkylation but it is preferable that from about 1.6 to about 2.4 equivalents of the basic salt be used per mole of zirconium compound. It appears that the best results are achieved when about 2 equivalents of the basic salt are used per mole of zirconium compound. For calcium salts, this corresponds to a mole ratio of about 1:1 (Ca:Zr) and for lithium salts, it corresponds to a mole ratio of about 2:1 (Li:Zr). Generally, when the ratio of salt equivalents to moles of zirconium is less than about 1.6:1 some Friedel-Crafts alkylation does take place and the yield of linear olefin suffers. If this ratio is more than about 2.4:1, then the productivity of the catalyst is not as efficient. If the ratio of salt equivalents to moles of zirconium is more than 4.0:1 then the advantages of the invention are lost because the productivity of the catalyst is drastically decreased.

The combined zirconium metal compound-basic salt catalyst component is activated with an organometallic compound which contains either zinc, magnesium or aluminum. The method of addition of the organometallic compound to the catalyst component is not particularly important and any one of a variety of methods including neat or solution of organometallic saturates in hydrocarbon or aromatic solvent can be used. It is preferred that the organometallic compound used be one that allows a fine suspension or a homogeneous solution in the hydrocarbon solvent used to be maintained in the process. The mole ratio of organometallic compound to zirconium metal compound should be in the range from about 2:1 to about 20:1, preferably from about 6:1 to about 15:1, most preferably about 10:1 because the highest productivity is in this region.

As discussed above, a wide variety of hydrocarbon solvents are useful in the present invention. Specific hydrocarbon solvents which can be used are toluene, xylene, mesetylene, heptane and hexane. Toluene is preferred because many of the salts form homogeneous solutions or fine dispersions in the solvent. Also, the productivity is higher than with xylene. There are also a large number of zirconium metal compounds which can be used as the catalyst component in this invention. The preferred zirconium metal compound is zirconium tetrachloride because it is relatively pure and inexpensive, but zirconium tetrabromide and mixed salts of zirconium can also be used. The organometallic compound is also selected from a group of a rather wide scope depending upon the choice of zirconium metal compound and basic salt. Ethyl aluminum sesquichloride and ethyl aluminum dichloride are preferred because they provide lower alpha olefins and triisobutyl aluminum and diethylaluminum chloride, among others may also be used. Also, the basic salt may be selected from a large group, depending upon the selection of the other components. Calcium stearate is preferred because it partially dissolves in the solvents of choice and other carboxylic acid salts such as calcium, lithium, sodium, magnesium, and aluminum benzoates may be used as well as the stearates thereof and other such acids having from 2 to 20 carbon atoms. The solvent, zirconium compound, and the basic salt are chosen on the basis of their ability to form a homogeneous solution or a fine suspension with each other.

It is theorized that one of the principal reasons why the process and catalyst of the present invention achieves the desired results of continuous polymerization and high catalyst activity without the necessity for catalyst killing or neutralization is that all of the components of the catalyst and preferably their various reaction products form a homogeneous overall catalyst composition in the hydrocarbon solvent of choice. This allows the desired reaction to proceed continuously without the disruption which might be caused by one of the components falling out of solution or suspension. Furthermore, intimate mixture of the base with the zirconium compound can be effective.

It is theorized that the presence of the basic salt in the catalyst prevents the isomerization of alpha olefins to internal olefins which will not polymerize. Also, it is theorized that the basic salt neutralizes the acid components present in the catalyst which are the primary cause of the Friedel-Craft reactions to undesirable side products. In the case of a zirconium chloride catalyst, for example, the negative ion of the basic salt most likely replaces the chloride during the reaction while the metal ion from the salt takes up the chloride. Addition of the corresponding carboxylic acid would produce free HCl which would cause isomerization and Friedel-Crafts alkylation.

The linear olefins (oligomers) produced according to the process of the present invention may then be used in a further polymerization process to produce higher molecular weight polymers and copolymers. The present invention contemplates a continuous process wherein ethylene, propylene or other alpha olefins are polymerized as described above to produce linear olefins which are then exposed to a polymerization catalyst such as a Ziegler-Natta catalyst containing titanium trichloride and diethyl aluminum chloride or a supported catalyst with a titanium chloride-magnesium chloride supported catalyst component combined with trialkyl aluminum Other monomers such as ethylene, propylene, 4-methyl-1-pentene, 1-butene, 1-hexene, 1-octene, etc. may be added to the polymerization reactor and the polymerization is carried out under normal polymerization conditions such as temperatures from about 50° C. to about 150° C. and pressures from about 5 atm. to about 500 atm. This method is particularly applicable to the manufacture of linear low density polyethylene products which are actually copolymers of ethylene and alpha olefins having 4 or more carbon atoms. The catalysts and processes used to make linear low density poly- ethylene and other polymers and copolymers of linear olefins are well known.

EXAMPLE I

A series of polymerizations (oligomerizations) were carried out in a stainless steel autoclave reactor at an ethylene pressure of 9 atmospheres and a temperature of 75°–80° C. Toluene was used as the solvent and it was deoxygenated and dried with molecular sieves. Calcium stearate was added to zirconium tetrachloride and toluene and stirred together. The catalyst was activated by adding ethyl aluminum sesquichloride to the reaction mixture and ethylene was pressured into the reactor and maintained at 9 atmospheres. The mole ratio of ethyl aluminum sesquichloride to zirconium tetrachloride was 10:1. The different catalyst components had different molar ratios of calcium stearate to zirconium tetrachloride. As can be seen by reviewing the graph in FIG. 1, the productivity in terms of grams of ethylene consumed per gram of zirconium tetrachloride increases as the mole ratio increases from 0 to about 1.0 and then it begins to fall off. Further, it is noted that at ratios lower than 0.8, the reaction mixture turned yellow on exposure to air which is evidence of Friedel-Crafts alkylation. Therefore, the optimum range for the mole ratio of calcium stearate to zirconium tetrachloride is from about 0.8 to about 1.2 (salt equivalents/ moles zirconium ratio is 1.6–2.4).

EXAMPLE II

The procedure of Example I was repeated in several polymerizations while the mole ratio of ethyl aluminum sesquichloride to zirconium tetrachloride was varied. The mole ratio of calcium stearate to zirconium tetrachloride was 1:1.

As can be seen by reviewing FIG. 2, the productivity of the catalyst increases as the molar ratio of ethyl aluminum sesquichloride to zirconium tetrachloride increases from 6 to 10 but falls off as the ratio is increased from 10 to 15. The optimum molar ratio appears to be around 10.

EXAMPLE III

The procedure of Example I was repeated for two oligomerizations wherein the ratio of calcium stearate to zirconium tetrachloride was 1:1 and the ratio of ethyl aluminum sesquichloride to zirconium tetrachloride was 10:1. In the first oligomerization, an ethylene pressure of 9 atmospheres was used and in the second oligomerization an ethylene pressure of 17 atmospheres was used. The productivity of the catalyst ranged from 67.4 grams of oligomer per gram of zirconiumhours-atmopshere to 71.2 grams. By referring to the graph in FIG. 3, it can be seen that the affect of pressure on the oligomerization reaction is generally linear.

EXAMPLE IV

Four polymerizations were carried out essentially in accordance with the procedure of Example I. In Experiment A, the procedure was the same except that no calcium stearate was used. In Experiment B, the mole ratio of calcium stearate to zirconium chloride was 0.2. In Experiment C, heptane was used as the solvent instead of toluene and the mole ratio of calcium stearate to zirconium tetrachloride was 1:1. In Experiment D, the exact procedure of Example I was used and the mole ratio of calcium stearate to zirconium tetrachloride was 1.1.

The reaction products from these four experiments were characterized by gas chromatographic (GC) analysis. The results are shown in FIG. 4. The analysis of the reaction product of Experiment A indicated the presence of unique peaks not accountable by comparison to alpha olefins. The peaks (3.98, 5.51, and 6.22) are indicative of Friedel-Crafts reaction products of the olefin with the toluene solvent. These were identified by gas chromotography mass spectrum (GCMS) analysis. GCMS analysis was used to prove alkylation occurred with toluene and without salt. The analysis of the reaction product of Experiment B shows similar peaks (3.78 and 5.38) but they are considerably smaller. It also shows at peak at 2.68 which is indicative of some alpha olefin production. The analysis for the reaction product of Experiment C indicates no Friedel-Crafts products peaks but the peaks indicative of alpha olefins (0.34 hexene, 0.95 toluene, 1.20 octene, 2.72 decene, 4.44 dodecene, 6.30 tetradecene, 7.88 hexadecene, 9.32 octadecene) are very small so the yield of such olefins is relatively low.

The analysis of the reaction product of Experiment D indicates that there are no unusual Friedel-Crafts peaks and also shows that the peaks characteristic of alpha olefins (0.33, 1.24, 2.74, 4.55, 6.24, 7.77 and 9.16) are relatively large, indicating a high yield of such olefins. Therefore, it can be seen that the preferred process of the present invention, as exemplified by Experiments C and D, does produce alpha olefins without the accompanying undesirable FriedelCrafts reaction products which, in prior art processes such as that disclosed in U.S. Pat. No. 4,442,309, can only be prevented by the addition of polymerization killing agents and neutralizing agents subsequent to polymerization or addition of components which might kill further polymerization with other catalysts.

EXAMPLE V

In this experiment, the procedure described in Russian Inventor's Certificate No. SU1042-701-A was duplicated. To a solution of 50 mil of toluene and 2.0 m mole (0.242 g) benzoic acid was added 0.5 m mole (0.1165 g) $ZrCl_4$. The mixture was stirred for 1 hour and 6 m moles of ethyl aluminum sesquichloride (in heptane 25%) was added. The mixture was transferred to a 1 liter autoclave reactor and charged with ethylene at 9 atmospheres and heated to 75°–83° C. Ethylene pressure was maintained throughout. Approximately 26 grams of ethylene was consumed.

When the reactor was opened, the reaction mixture became yellow and fuming, and the amount of olefin present rapidly decreased with time due to, it is theorized, Friedel-Crafts alkylation of the solvent. This was confirmed by GCMS of the reaction mixture. In order to be able to characterize the olefins, the reaction mixture had to be cooled and neutralized with aqueous potassium carbonate, as suggested in the Exxon patent, to prevent yellowing and alkylation. Without neutralization, ring alkylation was observed by GCMS analysis. Thus, it can be seen that this prior art process cannot accomplish the objectives of the present invention without neutralization with potassium carbonate or other alkaline compounds.

EXAMPLE VI

A series of oligomerizations were carried out using 25 ml of mixed xylenes, 0.42 m moles (0.10 g) $ZrCl_4$, salt as described in Table 1 and 3.75 m moles of ethyl aluminum sesquichloride. Reactions were run for 1 hour at 75° C. and 11.2 atmospheres of ethylene pressure. From the table it can be seen that calcium and lithium salts afford cleaner products and that calcium stearate is a preferred adduct. Compared to the method of the Exxon patent, which uses carboxylic acids as adducts, the cation seems to control the degree of isomerization as well increasing the productivity of the catalyst.

TABLE 1
EFFECT OF SALT ON OLIGOMERIZATION

| SALT[c] | GRAMS | M MOLES | YIELD (g) | G/G Zr | GAS CHROMATOGRAPHY |
|---|---|---|---|---|---|
| Ca(Bz)$_2$ | 0.14 | 0.41 | 17.2 g | 441 | Normal |
| Ca(St)$_2$ | 0.25 | 0.41 | 16.8 | 431 | Normal |
| NaBz | 0.14 | 0.98 | 1.6 | 41 | Isomerization[a] |
| NaSt | 0.24 | 0.78 | 6.7 | 172 | Isomerization[a] |
| LiBz | 0.11 | 0.86 | 11.2 | 287 | Normal |
| LiSt | 0.24 | 0.83 | 9.0 | 231 | Normal |
| Mg(Bz)$_2$ | 0.13 | 0.41 | 6.7 | 172 | Isomerization[a] |
| Mg(St)$_2$ | 0.24 | 0.41 | 8.4 | 215 | Isomerization[a] |
| Al(St)$_3$ | 0.24 | 0.28 | 13.6 | 349 | Isomerization[a] |
| — | — | — | — | — | — |
| Ca(St)$_2$ | 0.25 | 0.41[b] | 34.5 | 885 | Normal |
| Mg(St)$_2$ | 0.24 | 0.41[b] | 16.5 | 423 | Slight Isomerization |
| Mg(St)$_2$ | 0.24 | 0.41[b] | 17.0 | 436 | Slight Isomerization |
| LiBz | 0.11 | 0.86[b] | — | — | Normal |

[a]Yellow color Friedel-Crafts Alkylation.
[b]Toluene rather than xylenes as solvent.
[c]Bz = benzoate St = stearate

EXAMPLE VII

In the next five examples, ethylene-oligomer copolymers were prepared by synthesizing the olefins using optimum conditions according to the procedure of Example I and then injecting catalyst and an aluminum alkyl into the reaction mixture. In the first experiment, 11.7 g of olein was prepared. The reactor was cooled to $-5°$ C. and ethylene was vented. Then 0.1 g of a titanium on silica catalyst, 3 m moles of triethyl aluminum and 20 ml of heptane were injected into the reactor. Ethylene at 11.2 atmospheres was charged into the reactor and the polymerization was allowed to proceed at 80°-85° C. for 1 hour. At that time 46.8 g of ethylene was consumed. The reactor was vented and the polymer was dried and isolated to yield 57.8 g of material. The polymer had a density of 0.9191 and 8% branching by infrared analysis.

EXAMPLE VIII

Two runs were carried out in a similar manner to Example VII using a different titanium silica catalyst and afforded polymers with 0.9292–0.9318 density and 3.3–6.5 short chain branches/1000 carbon atoms.

EXAMPLE IX

A run was carried out using a titanium chloride and magnesium chloride supported catalyst and triethyl aluminum as the catalyst activator. In the oligomerization, 6.6 grams of olefin were consumed and in the polymerization 34.2 grams of ethylene were consumed. The actual polymer weighed 39.5 grams and had 7.9 short chain branches/1000 carbon atoms.

EXAMPLE X

In this experiment, 19.8 g of olefin was prepared. Then, without cooling the reactor or stopping the reaction, 50 mg of a catalyst (prepared by extensive ball-milling of TiCl$_3$AA with butyl benzoate) and 4.5 m moles of triethyl aluminum in 6 ml of heptane was added. Polymerization was allowed to proceed for 1 hour until another 27.8 g of ethylene was consumed. The reactor was vented and the polymer isolated and dried to yield 49.3 g of material with a density of 0.8886 and 17.8% branching.

EXAMPLE XI

In this experiment, 50 mg of the catalyst described in Example X was added to the reactor before oligomerization took place. Then 24.9 g of ethylene was oligomerized. The reactor was cooled to $-5°$ C. and the ethylene was vented off. A small amount of the mixture was analyzed by gas chromatography and this showed that a normal oligomerization had occurred. Then 6 m moles of triethyl aluminum and 7 ml of heptane were added. The reactor was pressured with ethylene and heated to 90° C. and polymerization occurred until another 64.3 g of ethylene was consumed. The polymer was isolated and weighed 95.6 g. It had a density of 0.9075 and 11.6% branching. These experiments (Examples VII–IX) indicate the olefins produced by my process are of polymerization grade quality without the necessity of purification and that they do not poison ethylene polymerization catalysts.

EXAMPLE XII

A propylene-oligomer copolymer was prepared as follows. By conditions described previously (in Example I) 20.7 g of ethylene was oligomerized. The reactor was cooled to $-10°$ C. and vented. To the reactor was added 100 mg of the catalyst described in Example X as well as 3.75 m moles of triethyl aluminum in 12.5 ml of heptane. The reactor pressured to 9.5 atmospheres of propylene and heated to 70° C. Polymerization took place until 36.6 g of propylene was consumed. The reactor was vented and the polymer isolated and dried to give 58.9 g of copolymer which had 68% propylene by carbon 13 nuclear magnetic resonance spectroscopy. The spectrum was consistent with a random, rather than a block, copolymer.

I claim:
1. A catalyst active for oligomerizing one or more oligomerizable alpha olefin monomers in a hydrocarbon solvent to produce linear olefin oligomers of from about 4 to about 20 carbon atoms, said oligomerization catalyst comprising an organometallic compound wherein the metal thereof is selected from the group consisting of zinc, magnesium, and aluminum, in combination with the reaction mixture obtained by reacting in a hydrocarbon,
(a) a zirconium compound of the formula $ZrX_nY_{4-n}$ wherein X is a halogen, Y is selected from the group consisting of aryloxides, alkoxides, and carboxylates, and n ranges from 1 to 4, inclusive, and
(b) a basic salt of a carboxylic acid, wherein the ratio of basic salt equivalents to moles of zirconium compound in said oligomerization catalyst is from above zero to about 4.0:1 and the amount of said basic salt is sufficient to inhibit Fridel-Crafts alkylation during said oligomerization, said basic salt forming a fine suspension or homogenous solution with said solvent.

2. The catalyst of claim 1 wherein the zirconium compound is $Z_4Cl_4$.

3. The catalyst of claim 1 wherein the organometallic compound is selected from the group consisting of aluminum, zinc and magnesium alkyls.

4. The catalyst of claim 3 wherein the organometallic compound is an alkyl aluminum sesquihalide, an aluminum trialkyl, of an alkyl aluminum dihalide.

5. The catalyst of claim 4 wherein the organometallic compound is ethyl aluminum sesquichloride or ethyl aluminum dichloride.

6. The catalyst of claim 1 wherein the mole ratio of organometallic compound to zirconium compound is from about 2:1 to about 20:1.

7. The catalyst of claim 6 wherein the mole ratio of organometallic compound to zirconium compound is from about 6:1 to about 15:1.

8. The catalyst of claim 1 wherein the basic salt is selected from the group consisting of lithium, sodium, potassium, magnesium, calcium, zinc or aluminum salts of saturated, unsaturated or aromatic carboxylic acids.

9. The catalyst of claim 8 wherein the basic salt is selected from the group consisting of lithium and calcium salts of carboxylic acids having from 2 to 20 carbon atoms.

10. The catalyst of claim 9 wherein the basic salt is calcium or lithium stearate.

11. The catalyst of claim 1 wherein the zirconium compound is $ZrCl_4$, the organometallic compound is ethyl aluminum sesquichloride or ethyl aluminum dichloride, and the basic salt is calcium stearate.

12. The catalyst of claim 1 wherein the ratio of salt equivalents to moles of zirconium compound is from about 1.6:1 to about 2.4:1.

* * * * *